US010247303B2

United States Patent
Nassouri

(10) Patent No.: US 10,247,303 B2
(45) Date of Patent: Apr. 2, 2019

(54) SYSTEM AND METHOD FOR CALCULATING VEHICLE SPEED AND CONTROLLING A CONTINUOUSLY VARIABLE TRANSMISSION

(71) Applicant: GM GLOBAL TECHNOLOGY OPERATIONS LLC, Detroit, MI (US)

(72) Inventor: Crystal J. Nassouri, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 566 days.

(21) Appl. No.: 15/005,293

(22) Filed: Jan. 25, 2016

(65) Prior Publication Data
US 2017/0211696 A1 Jul. 27, 2017

(51) Int. Cl.
*F16H 61/662* (2006.01)
*F16H 59/48* (2006.01)
*F16H 9/16* (2006.01)
*F16H 61/02* (2006.01)
*F16H 61/66* (2006.01)
F16H 59/50 (2006.01)
F16H 59/44 (2006.01)

(52) U.S. Cl.
CPC ............. *F16H 61/662* (2013.01); *F16H 9/16* (2013.01); *F16H 59/48* (2013.01); *F16H 61/0213* (2013.01); *F16H 61/66* (2013.01); F16H 59/44 (2013.01); F16H 59/50 (2013.01); F16H 2059/506 (2013.01); F16H 2061/0239 (2013.01); F16H 2061/66218 (2013.01)

(58) Field of Classification Search
CPC . F16H 2061/66218; F16H 2061/66204; F16H 2061/66227; F16H 2061/66231; F16H 2061/0239; F16H 61/662; F16H 2059/506; F16H 59/48
See application file for complete search history.

(56) References Cited

U.S. PATENT DOCUMENTS 5,857,937 A * 1/1999 Ashizawa ......... F16H 61/66254
477/43
9,353,858 B2 * 5/2016 Kinoshita ............. F16H 61/662
2007/0099753 A1 5/2007 Matsui et al.

FOREIGN PATENT DOCUMENTS

CN 105257820 A 1/2016

* cited by examiner

*Primary Examiner* — Erin D Bishop
(74) *Attorney, Agent, or Firm* — Quinn IP Law

(57) ABSTRACT

A system and method for controlling a vehicle having a continuously variable transmission (CVT) comprises a control system having at least one controller, an accelerometer and one or more sensors in communication with the at least one controller to monitor and detect a change in an operational state of the vehicle. The control system determines a vehicle acceleration rate with the accelerometer in response to the change in the operational state of the vehicle. An adjusted vehicle speed is computed based, at least in part, on the vehicle acceleration rate. A variator speed ratio is generated based upon the adjusted vehicle speed and transmitted to the variator assembly of the CVT.

17 Claims, 2 Drawing Sheets

SYSTEM AND METHOD FOR CALCULATING VEHICLE SPEED AND CONTROLLING A CONTINUOUSLY VARIABLE TRANSMISSION

TECHNICAL FIELD

The present disclosure pertains to a system and method for detecting vehicle speed during a loss of traction event to control a continuously variable transmission (CVT).

BACKGROUND

A continuously variable transmission (CVT) is a type of power transmission that is capable of continuously changing an output/input speed ratio over a range between a minimum (underdrive) ratio and a maximum (overdrive) ratio, thus permitting infinitely variable selection of engine operation that achieves a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system.

The pulley system, which is commonly referred to as a variator assembly, can transition anywhere within the calibrated range of speed ratios. A typical variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and input gear set, and thus acts as a driving/primary pulley. The other pulley is connected via additional gear sets to an output shaft of the CVT and thus acts as a driven/secondary pulley. One or more planetary gear sets may be used on the input or output sides of the variator assembly depending on the configuration.

In order to vary a CVT speed ratio, a clamping force is applied to the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This in turn changes the effective diameters of the variator pulleys and varies the speed ratio of the CVT.

Driving conditions, such as the occurrence of a traction control event or the like, may affect the operational state or condition of the vehicle. The resultant effect of the driving conditions may cause the CVT to underperform or overexert relative to normal driving conditions.

SUMMARY

A system and method for controlling a vehicle having a continuously variable transmission (CVT) comprises a control system having at least one controller, an accelerometer and one or more sensors in communication with the at least one controller to monitor and detect a change in an operational state of the vehicle. The control system determines a vehicle acceleration rate with the accelerometer in response to the change in the operational state of the vehicle. An adjusted vehicle speed is computed based, at least in part, on the vehicle acceleration rate during the change in the operational state of the vehicle. A variator speed ratio is generated based upon the adjusted vehicle speed and is transmitted to the variator assembly in response to the change in the operational state of the vehicle.

The method of controlling a vehicle having a continuously variable transmission (CVT) may further comprise the step of computing the adjusted vehicle speed by detecting a grade acceleration signal with the accelerometer and determining an adjusted vehicle acceleration rate by computing a difference between the vehicle acceleration rate and the grade acceleration signal. The adjusted vehicle speed may be computed during the change in the operational state of the vehicle by numerically integrating the adjusted vehicle acceleration.

The method of controlling a vehicle having a continuously variable transmission (CVT) may further comprise the step of maintaining the grade acceleration signal at a constant value during the change in the operational state of the vehicle. The method may also include the step of computing the adjusted vehicle speed by numerically integrating the adjusted vehicle acceleration using Simpson's rule integration.

One or more wheel speed sensors may be disposed proximate to one or more wheels of the vehicle to detect a rotational speed of the one or more wheels to detect the vehicle speed. The variator speed ratio may be generated based upon the vehicle speed detected by the one or more wheel speed sensors when the control system does not detect a change in the operational state of the vehicle. In another embodiment of the disclosure, the method of detecting the wheel speed may include detecting a differential between wheel speeds with the one or more sensors to determine if a threshold has been exceeded between the driven and nondriven wheels.

In yet another embodiment of the disclosure, the method of detecting the wheel speed may include detecting individual wheel speeds and vehicle acceleration with the accelerometer and one or more sensors to identify a loss of wheel traction event. In another embodiment of the disclosure, the method of determining the change in the operational state of the vehicle further comprises identifying a traction control event with a traction control module in electrical communication with the control system if the vehicle speed exceeds a predetermined vehicle speed threshold. The method may further comprise the step of maintaining the adjusted variator speed ratio responsive to the change in the operational state of the vehicle until cessation of the traction control event.

In another embodiment of the disclosure, a vehicle comprising an internal combustion engine and a continuously variable transmission (CVT) having an input member and an output member includes a variator assembly including a first pulley and a second pulley, the first and second pulleys rotatably coupled by a flexible continuous rotatable device, wherein the first pulley is rotatably coupled to an input member and the second pulley is rotatably coupled to an output member. The vehicle further includes a control system having at least one controller, an accelerometer and one or more sensors in communication with the at least one controller and an executable instruction set.

The executable instruction set of the control system may monitor an operational state of the vehicle and detect an event causing a change in the operational state of the vehicle. A vehicle acceleration rate may be detected with an accelerometer in communication with the control system. An adjusted vehicle speed may be computed, based, at least in part, on the vehicle acceleration rate. A variator speed ratio is generated based upon the adjusted vehicle speed and transmitted to the variator assembly in response to the event change in the operational state of the vehicle.

In another embodiment of the disclosure, the executable instruction set of the control system may further detect a grade acceleration signal with the accelerometer and determine an adjusted vehicle acceleration rate by computing a difference between the vehicle acceleration rate and the grade acceleration signal. An adjusted vehicle speed may be computed during the change in the operational state of the vehicle by numerically integrating the adjusted vehicle acceleration. The grade acceleration signal may be maintained at a constant value during the change in the operational state of the vehicle.

In yet another embodiment of the disclosure, one or more wheel speed sensors may be disposed proximate to one or more wheels of the vehicle to detect a rotational speed of the one or more wheels to detect the vehicle speed. The variator speed ratio may be generated based upon the vehicle speed detected by the one or more wheel speed sensors when the control system does not detect a change in the operational state of the vehicle. The adjusted variator speed ratio generated by the control system may be maintained in response to the change in the operational state of the vehicle until cessation of the traction control event.

In another embodiment of the disclosure, a method for controlling a vehicle having a continuously variable transmission (CVT) including a variator assembly comprises the steps of monitoring an operational state of the vehicle with a control system having at least one controller, an accelerometer and one or more sensors in communication with the at least one controller. An event causing a change in the operational state of the vehicle is detected with the accelerometer and one or more sensors. A vehicle acceleration rate and a grade acceleration signal is determined with the accelerometer.

The grade acceleration signal is maintained at a constant value during the change in the operational state of the vehicle. The control system determines an adjusted vehicle acceleration rate by computing a difference between the vehicle acceleration rate and the grade acceleration signal. The control system computes the adjusted vehicle speed during the change in the operational state of the vehicle by numerically integrating the adjusted vehicle acceleration.

A variator speed ratio is generated based upon the adjusted vehicle speed and is transmitted to the variator assembly in response to the change in the operational state of the vehicle. The adjusted variator speed ratio may be maintained in response to the change in the operational state of the vehicle until cessation of the traction control event.

The above noted and other features and advantages of the present disclosure are readily apparent from the following detailed description when taken in connection with the accompanying drawings.

DETAILED DESCRIPTION

Figure 1:
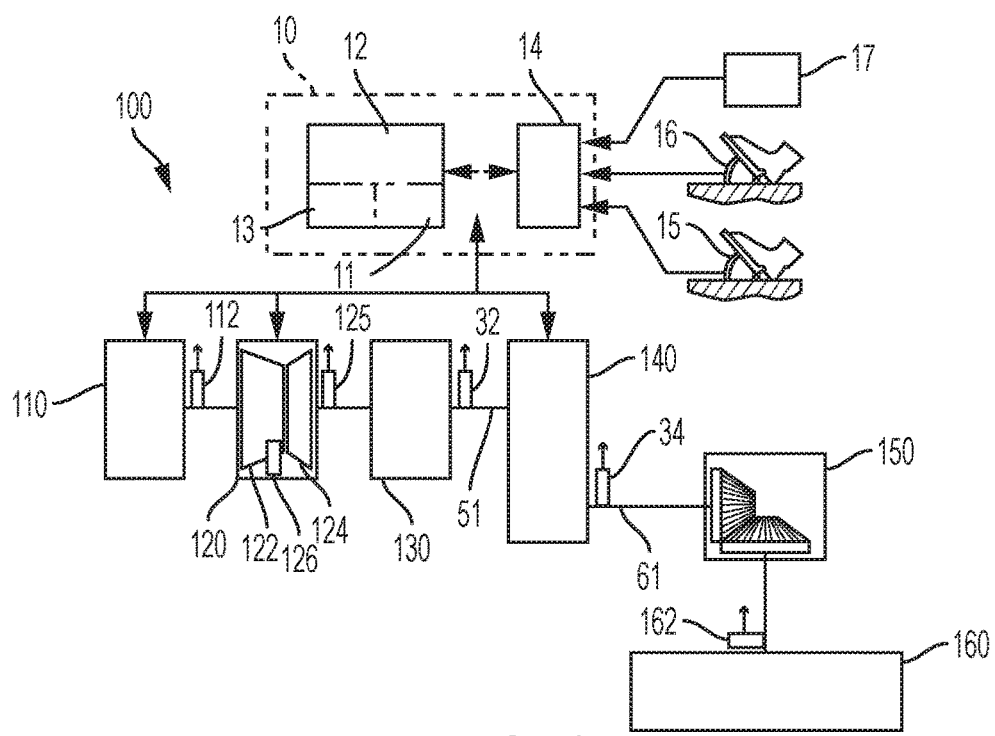
FIG. 1 is a schematic illustration of a powertrain system that includes an internal combustion engine rotatably coupled to a continuously variable transmission (CVT) via a torque converter and a gear box, in accordance with the disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring now to the drawings, wherein like reference numbers correspond to like or similar components throughout the several figures, FIG. 1 schematically illustrates elements of a powertrain system 100 of a vehicle that includes a torque generating device such as an internal combustion engine (engine) 110 rotatably coupled to a continuously variable transmission (CVT) 140 via a torque converter 120 and a gear box 130. The vehicle, for illustrative purposes, may constitute a motor vehicle. However, it is understood that the vehicle may be any mobile platform, such as an airplane, all-terrain vehicle (ATV), boat, personal movement device, robot and the like to accomplish the purposes of this disclosure.

For illustrative consistency, the torque generating device will be described hereinafter as an engine 110. The torque generating device may be any suitable internal combustion engine capable of transforming hydrocarbon fuel to mechanical power to generate torque in response to commands originating from the control system. Alternatively, the torque generating device may be embodied as an electric machine or other device operable for generating output torque.

The powertrain system 100 couples via a driveline 150 to one or more vehicle wheels 160 to provide tractive effort when employed on a vehicle. Operation of the powertrain system 100 is monitored by and controlled by a control system 10 in response to driver commands and other factors. The powertrain system 100 may be part of a device which may be a vehicle, a bicycle, a robot, farm implement, sports-related equipment or any other transportation device.

The torque converter 120 is a device providing fluidic coupling between its input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10.

The output member of the torque converter 120 rotatably couples to the gear box 130, which includes meshed gears or other suitable gearing mechanisms that provide reduction gearing between the torque converter 120 and the CVT 140. Alternatively, the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member 61 that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gear set, a chain drive gear set or another suitable gear arrangement for transferring torque to one or more vehicle wheels 160.

The powertrain system 100 preferably includes one or more sensors or sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162. Each of the aforementioned speed sensors may be any suitable position/speed sensing device, such as a Hall-effect sensor. Each of the aforementioned speed sensors communicates with the control system 10. As used herein the term 'speed' and related terms refer to a rotational speed of a rotating member, unless specifically indicated otherwise. As used herein the term 'position' and related terms refer to a rotational or angular position of a rotating member, unless specifically indicated otherwise.

The control system 10 preferably includes at least one controller 12 and a user interface 14. A single controller 12 is shown for ease of illustration. The controller 12 may include a plurality of controller devices wherein each of the controllers 12 is associated with monitoring and controlling a single system. This may include an engine control module (ECM) for controlling the engine 110 and a transmission controller (TCM) for controlling the CVT 140 and for monitoring and controlling a single subsystem, e.g., a torque converter clutch.

The controller 12 preferably includes at least one processor and at least one memory device 11 (or any non-transitory, tangible computer readable storage medium) on which are recorded instructions for executing instruction sets for controlling the CVT and a memory cache 13. The memory device 11 can store controller-executable instruction sets, and the processor can execute the controller-executable instruction sets stored in the memory device 11. The user interface 14 communicates with and monitors operator input devices including, e.g., an accelerator pedal 15, a brake pedal 16 and a transmission gear selector or transmission control module (TCM) 17.

As used herein, the term speed ratio refers to a variator speed ratio, which is a ratio of a CVT output speed and a CVT input speed. The CVT input speed may be determined based upon a signal input from one of the engine speed sensor 112, the torque converter turbine speed sensor 125, or the input speed sensor 32, as described herein, or another suitable speed/position sensor. The CVT output speed may be determined based upon a signal input from the output speed sensor 34 or the wheel speed sensor 162 as described herein, or another suitable speed/position sensor. The speed ratio parameters are determined based upon the CVT input speed and the CVT output speed.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
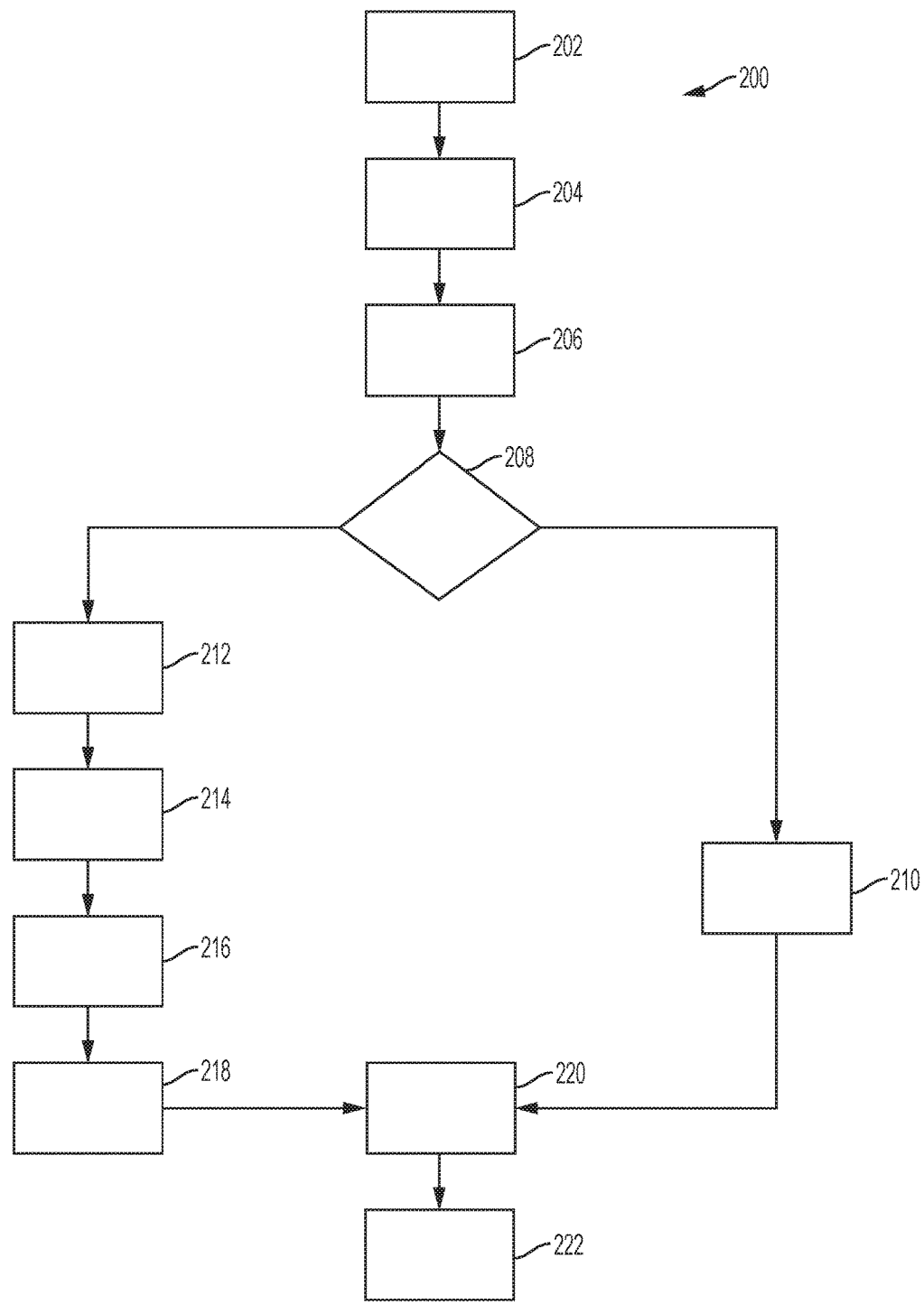
FIG. 2 schematically shows a block diagram of a control system that can be employed to adjust the variator speed ratio in a CVT in response to a vehicle condition, in accordance with the disclosure.

The control system 10 of FIG. 1 is programmed to execute the steps of the method as defined in FIG. 2 and as discussed in greater detail below. Referring now to FIG. 2, a flowchart of the method 200 stored on an instruction set and executable by the controller of the control system is shown. It is understood that method 200 need not be applied in the specific order recited herein. Furthermore, it is to be understood that some steps may be eliminated. Method 200 may be implemented when the operational state of the vehicle changes such that traditional vehicle speed monitoring devices may provide inaccurate information to the control system.

After initialization, the method 200 may commence with step or block 202, where the control system is programmed or configured to monitor and detect the operating state of the vehicle. The one or more sensors or sensing devices cooperate with the control system to monitor the operational state of the vehicle and detect whether the vehicle is operating in a normal operation mode or whether there is a change in the operational state of the vehicle such as the vehicle operating in a traction control mode or other operational state.

The traction control operation state may be a series of instructions executed by the control system to improve the ability of a vehicle to maintain a grip of a road surface if the vehicle encounters standing water, ice and the like on the road surface. It is understood that the method described herein may be used in combination with a variety of other vehicle operational elements, including, but not limited to, braking systems, engine fuel supply and throttle control.

It is also understood that the one or more sensors monitoring at least one vehicle operation state may include, but may not be limited to vehicle speed, engine speed, torque converter turbine speed, CVT variator input speed, CVT variator output speed, brake pedal actuation, accelerator pedal actuation, TCM gear state, vehicle acceleration, engine acceleration and wheel speed sensors. The control system may identify an initial variator speed ratio and evaluate the desired variator speed ratio, which may be determined based upon monitored and estimated operating conditions related to an output power command, vehicle speed, engine torque, and other factors, using a variety of sensors to evaluate speed ratio parameters to identify the CVT input speed and the CVT output speed as described above.

At step or block 204, the one or more sensors of the control system detect vehicle speed input from one or more velocity sensors or wheel speed sensors. For illustrative purposes, the term wheel speed sensor will be used in place of velocity sensor. It is understood that the vehicle speed input may be determined by evaluating the sensed rotational speed at each vehicle or wheel or at each pair of wheels.

At step or block 206, the control system is in electrical communication with at least one accelerometer to determine a grade acceleration signal and vehicle acceleration rate from the accelerometer. The accelerometer may be used to detect a number of static and/or dynamic vehicle operation parameters, including, but not limited to, force, mass, acceleration and the angle of inclination of the vehicle. In one embodiment of the disclosure, the accelerometer may be used to determine force acting on the vehicle to determine whether the vehicle is traveling on a flat surface or if the vehicle is traveling on a grade surface over a period of time.

At step or block 208, the control system detects and determines whether the vehicle encounters a change in the operational state of the vehicle, including, but not limited to, a traction control event, a wheel slip event, a wheel lock event or a sudden stop event. In one embodiment of the disclosure, the control system may be in electrical communication with the traction control module (TCM) of the vehicle and determine whether the TCM is in an active operation mode. In another embodiment of the disclosure, the control system monitors criteria related to certain types of vehicle events or driver actions that may damage the CVT, including, but not limited to, a generalized road disturbance, a sudden stop or deceleration of the vehicle, a loss of vehicle traction such as a wheel slip event or the like a rolling direction change of the vehicle.

If the control system does not detect actuation of the TCM or a traction control event, the control system utilizes the vehicle speed collected from the one or more wheel speed sensors at step or block 210 to produce and apply a desired variator speed ratio for use by and operation of the CVT as will be described in greater detail below. The existence of a wheel slip, wheel lock or control panic event may cause the one or more wheel speed sensors to detect an inaccurate vehicle speed.

Should the one or more sensors detect the existence or execution of a critical vehicle maneuver or event, the control system in electrical communication with the one or more sensors, will evaluate the sensor feedback to identify the event or maneuver and adjust operation of the CVT as will be described in greater detail below. The control system may utilize a compensation strategy to identify the type of critical event or maneuver and apply at least one control element to the variator assembly of the CVT to avoid damage or abuse to the CVT.

For example, use of an incorrect vehicle speed may result in an engine overspeed event or generation of excessive torque as the wheel speed may be too fast or too slow during a traction control event. If the control system detects a change in the operational state of the vehicle such as actuation of the TCM or a traction control event, the control system obtains the vehicle acceleration rate from the accelerometer at step or block 212.

In one embodiment of the disclosure, the control system may use a constant or maintained acceleration grade signal in combination with the vehicle acceleration rate received from the accelerometer to calculate an adjusted vehicle speed. Use of a constant or maintained acceleration grade signal with the rate of acceleration may eliminate potential variances associated with the use of a calculated acceleration grade signal. For purposes of this disclosure, a constant or maintained acceleration grade signal represents an acceleration grade signal that does not change over a defined period of time. At step or block 214, the control system subtracts the value of the constant grade acceleration signal from the vehicle acceleration rate detected by the accelerometer to calculate an adjusted vehicle acceleration rate.

At step or block 216, the control system performs a numerical integration of the adjusted vehicle acceleration rate to identify an adjusted vehicle speed. In one embodiment of the disclosure, the control system performs a Simpson's rule integration on the resultant adjusted acceleration rate from block 214 to create the adjusted vehicle speed. It is also understood that other types of integration may be used to accomplish the objectives of the disclosure.

At step or block 218, the control system evaluates the adjusted vehicle speed from step or block 216 against a reference data set of variator speed ratios for the CVT. Based upon the operating state of the vehicle and the vehicle speed detected at step or block 210 or 218 respectively, the control system applies a variator speed ratio for use by the CVT and adjusts the CVT to employ an adjusted variator ratio to avoid disruption of or damage to the CVT.

At step or block 220, the control system, based upon detection of the change in the operational state of the vehicle such as a critical event or maneuver, applies the corrective action identified in block 208 to set the appropriate variator speed ratio or compensation for the CVT to correct for the critical event. The corrected variator speed ratio is transmitted to the CVT at step or block 222 to apply the desired variator speed ratio to the CVT.

The controller 12 of the control system 10 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for controlling a vehicle having a continuously variable transmission (CVT) including a variator assembly comprising:
    monitoring an operational state of the vehicle with a control system having at least one controller, an accelerometer and one or more sensors in communication with the at least one controller;
    determining a vehicle acceleration rate with the accelerometer;
    determining when the vehicle encounters an event causing a change in the operational state of the vehicle with the accelerometer and the one or more sensors;
    computing an adjusted vehicle speed, based, at least in part, on the vehicle acceleration rate in response to the event causing the change in the operational state of the vehicle, wherein the step of computing the adjusted vehicle speed further comprises:
        detecting a grade acceleration signal with the accelerometer,
        determining an adjusted vehicle acceleration rate by computing a difference between the vehicle acceleration rate and the grade acceleration signal, and
        computing the adjusted vehicle speed during the change in the operational state of the vehicle by numerically integrating the adjusted vehicle acceleration;
    generating a variator speed ratio based upon the adjusted vehicle speed; and
    transmitting the variator speed ratio in response to the change in the operational state of the vehicle to the variator assembly.

2. The method of claim 1 further comprising the step of maintaining the grade acceleration signal at a constant value in response to the event causing the change in the operational state of the vehicle.

3. The method of claim 1 wherein the step of computing the adjusted vehicle speed further comprises numerically integrating the adjusted vehicle acceleration using Simpson's rule integration.

4. The method of claim 1 wherein the step of determining whether the vehicle encounters the event causing the change in the operational state of the vehicle with the accelerometer and the one or more sensors further comprises providing proximate to one or more wheels of the vehicle and detecting a vehicle speed input with the one or more wheel speed sensors based upon a rotational speed of the one or more wheels.

5. The method of claim 4 wherein the step of generating a variator speed ratio further comprises generating the variator speed ratio based upon the vehicle speed input detected by the one or more wheel speed sensors when the control system determines the vehicle has not encountered the event causing the change in the operational state of the vehicle.

6. The method of claim 4 wherein the step of detecting the vehicle speed input with the one or more wheel speed sensors based upon the rotational speed of the one or more wheels further comprises detecting a differential in the rotational speed of the one or more wheels with the one or more wheel speed sensors to determine if the vehicle speed input exceeds a predetermined vehicle speed threshold.

7. The method of claim 1 wherein the step of determining the when the vehicle encounters the event causing the change in the operational state of the vehicle further comprises providing a traction control module for identifying a traction control event as the change in the operational state of the vehicle, wherein the traction control module is in electrical communication with the control system of the vehicle.

8. The method of claim 7 further comprising a step of maintaining the adjusted variator speed ratio responsive to the event causing the change in the operational state of the vehicle until cessation of the traction control event.

9. A vehicle comprising:
    an internal combustion engine;
    a continuously variable transmission (CVT) comprising:
        an input member;
        an output member;
    a variator assembly including a first pulley and a second pulley, the first and second pulleys rotatably coupled by a flexible continuous rotatable device, wherein the first pulley is rotatably coupled to an input member and the second pulley is rotatably coupled to an output member; and
    a control system having at least one controller, an accelerometer and one or more sensors in communication with the at least one controller, the control system including an instruction set, the instruction set executable to:
        monitor an operational state of the vehicle,
        detect a vehicle acceleration rate with the accelerometer in communication with the control system,
        detect an event causing a change in the operational state of the vehicle,
        compute an adjusted vehicle speed, based, at least in part, on the vehicle acceleration rate in response to the event causing the change in the operational state of the vehicle, wherein the computation of the adjusted vehicle speed further comprises:
            detecting a grade acceleration signal with the accelerometer, determining an adjusted vehicle acceleration rate by computing a difference between the vehicle acceleration rate and the grade acceleration signal, and computing the adjusted vehicle speed during the change in the operational state of the vehicle by numerically integrating the adjusted vehicle acceleration, generate a variator speed ratio based upon the adjusted vehicle speed, and transmit the variator speed ratio in response to the event change in the operational state of the vehicle to the variator assembly.

10. The vehicle of claim 9 wherein the grade acceleration signal is maintained at a constant value during the change in the operational state of the vehicle.

11. The vehicle of claim 9 wherein the step executable to compute the adjusted vehicle speed further comprises numerically integrating the adjusted vehicle acceleration using Simpson's rule integration.

12. The vehicle of claim 9 further comprising one or more wheel speed sensors of the one or more sensors disposed proximate to one or more wheels of the vehicle to detect a rotational speed of the one or more wheels to determine a vehicle speed input.

13. The vehicle of claim 12 wherein the step executable to generate the variator speed ratio further comprises generating the variator speed ratio based upon the vehicle speed input detected by the one or more wheel speed sensors when the control system determines the vehicle has not encountered the event causing the change in the operational state of the vehicle.

14. The vehicle of claim 9 wherein the instruction set of the control system further comprises a step executable to maintain the adjusted variator speed ratio responsive to the event causing the change in the operational state of the vehicle until cessation of the event.

15. A method for controlling a vehicle having a continuously variable transmission (CVT) including a variator assembly comprising:

monitoring an operational state of the vehicle with a control system having at least one controller, an accelerometer and one or more sensors in communication with the at least one controller;

detecting an event causing a change in the operational state of the vehicle with the accelerometer and one or more sensors;

determining a vehicle acceleration rate and a grade acceleration signal with the accelerometer;

maintaining the grade acceleration signal at a constant value during the change in the operational state of the vehicle;

determining an adjusted vehicle acceleration rate by computing a difference between the vehicle acceleration rate and the grade acceleration signal;

computing an adjusted vehicle speed during the change in the operational state of the vehicle by numerically integrating the adjusted vehicle acceleration;

generating a variator speed ratio based upon the adjusted vehicle speed; and transmitting the variator speed ratio in response to the change in the operational state of the vehicle to the variator assembly.

16. The method of claim 15 wherein the step of computing the adjusted vehicle speed further comprises numerically integrating the adjusted vehicle acceleration using Simpson's rule integration.

17. The method of claim 15 further comprising a step of maintaining the adjusted variator speed ratio responsive to the event causing the change in the operational state of the vehicle until cessation of the event.

* * * * *